United States Patent
Balasubramanian (10) Patent No.: US 9,772,830 B2
(45) Date of Patent: Sep. 26, 2017

(54) SYSTEM AND METHOD FOR MODELING CLOUD RULES FOR MIGRATION TO THE CLOUD

(71) Applicant: SYNTEL, INC., Troy, MI (US)

(72) Inventor: Ashok Balasubramanian, Irving, TX (US)

(73) Assignee: Syntel, Inc., Troy, MI (US)

( * ) Notice: Subject to any disclaimer, the term of this patent is extended or adjusted under 35 U.S.C. 154(b) by 0 days.

(21) Appl. No.: 13/746,554

(22) Filed: Jan. 22, 2013

(65) Prior Publication Data

US 2013/0212553 A1 Aug. 15, 2013

Related U.S. Application Data

(60) Provisional application No. 61/588,255, filed on Jan. 19, 2012.

(51) Int. Cl.
*G06F 9/44* (2006.01)
*G06F 9/45* (2006.01)
*G06Q 10/06* (2012.01)
*G06F 9/445* (2006.01)

(52) U.S. Cl.
CPC .......... *G06F 8/51* (2013.01); *G06F 8/30* (2013.01); *G06F 8/60* (2013.01); *G06Q 10/06* (2013.01)

(58) Field of Classification Search
CPC .......... G06F 11/3684; G06F 11/769; G06F 17/30578; G06F 9/4856; G06F 9/544; G06F 8/51; G06Q 10/06
USPC ......... 717/2, 102, 170, 176; 707/602; 726/1; 709/218, 224; 718/1
See application file for complete search history.

(56) References Cited

U.S. PATENT DOCUMENTS

| | | | |
|---|---|---|---|
| 5,860,011 A * | 1/1999 | Kolawa | G06F 8/20 717/131 |
| 7,379,996 B2 | 5/2008 | Papatla et al. | |
| 7,987,262 B2 | 7/2011 | Tung et al. | |
| 8,010,460 B2 | 8/2011 | Work et al. | |
| 8,504,689 B2 | 8/2013 | Ferris et al. | |
| 2002/0023257 A1* | 2/2002 | Charisius et al. | 717/2 |
| 2002/0156893 A1* | 10/2002 | Pouyoul | G06F 9/544 709/225 |
| 2005/0149582 A1* | 7/2005 | Wissmann | G06F 17/30578 |
| 2005/0193269 A1* | 9/2005 | Haswell | G06F 11/3684 714/38.13 |
| 2008/0255895 A1 | 10/2008 | Rajamony et al. | |
| 2009/0254572 A1* | 10/2009 | Redlich | G06Q 10/06 |

(Continued)

OTHER PUBLICATIONS

Frey et al, "Automatic Conformance Checking for Migrating Software Systems to Cloud Infrastructures and Platforms", Journal Softw Maint. Evol: Res. Pract. Wiley & Sons—copyright 2011, p. 1-27 <Frey_Migr2011.pdf>.*

(Continued)

*Primary Examiner* — Tuan Vu
(74) *Attorney, Agent, or Firm* — Dykema Gossett PLLC (57) ABSTRACT

A computerized system and method of migrating an application from a source platform to a target platform, such as a cloud platform. A set of rules are developed that represent aspect of the target platform and the source code of the application to be migrated is analyzed to determine whether it violates any of these rules. In some embodiments, the source code could be automatically modified to correct for violations of the rules.

20 Claims, 10 Drawing Sheets

(56) References Cited

U.S. PATENT DOCUMENTS

| | | | |
|---|---|---|---|
| 2010/0333116 A1 | 12/2010 | Prahlad et al. | |
| 2011/0107327 A1* | 5/2011 | Barkie et al. | 717/176 |
| 2011/0126197 A1* | 5/2011 | Larsen et al. | 718/1 |
| 2011/0270968 A1 | 11/2011 | Salsburg et al. | |
| 2011/0276675 A1 | 11/2011 | Singh et al. | |
| 2011/0276684 A1* | 11/2011 | Singh | G06F 9/4856 |
| | | | 709/224 |
| 2011/0302277 A1 | 12/2011 | Baker | |
| 2012/0054731 A1 | 3/2012 | Aravamudan et al. | |
| 2012/0060142 A1* | 3/2012 | Fliess et al. | 717/102 |
| 2012/0102193 A1 | 4/2012 | Rathore et al. | |
| 2012/0124081 A1* | 5/2012 | Ebrahimi et al. | 707/769 |
| 2012/0131567 A1* | 5/2012 | Barros et al. | 717/170 |
| 2012/0185913 A1* | 7/2012 | Martinez et al. | 726/1 |
| 2012/0265726 A1* | 10/2012 | Padmanabhan et al. | 707/602 |
| 2012/0304179 A1 | 11/2012 | Devarakonda et al. | |
| 2013/0007216 A1* | 1/2013 | Fries et al. | 709/218 |
| 2013/0061146 A1 | 3/2013 | Kirby | |
| 2013/0124713 A1* | 5/2013 | Feinberg | G06F 11/0769 |
| | | | 709/224 |
| 2014/0012562 A1 | 1/2014 | Chang et al. | |
| 2014/0068053 A1 | 3/2014 | Ravi et al. | |

OTHER PUBLICATIONS

Shrestha Sanjay, "Sonar—Code quality Analysis Tool", Aug. 2010 http://blogs.sourceallies.com/2010/02/sonar-code-quality-analysis-tool, 1 pg. <SonarQAT_Aug10.pdf>.*

SOpenSource, "Open Source Code Quality Tools: Sonar", Sep. 2010, pp. 1-3 <Sonar_SoS_Sept10.pdf>.*

Beserra et al., "Cloudstep: A Step-by-Step Decision Process to Support Legacy Application Migration to the Cloud," 2012 IEEE International Workshop on Maintenance and Evolution of Service-Oriented and Cloud-Based Systems, (Sep. 24, 2012, pp. 7-16).

"Burton Group Highlights Five Cloud Computing Adoption Steps for CIOs", Business Wire, (Jul. 28, 2010, 2 pgs.).

"Creating a Roadmap to the Cloud", General Dynamics Information Technology, (Aug. 2012, 2 pgs.)

"Hanu Software Launches Online Cloud Application Assessment Portal," Business Wire, (Oct. 24, 2012, 2 pgs.).

"NCS Azure Cloud Consulting Services," NCS Ptd. Ltd., (2010, 2 pgs.).

"Oracle Cloud Blueprint and Roadmap Service," Oracle, (2012, 2 pgs.).

"Oracle Consulting Cloud Services Framework", Oracle, (2010, 2 pgs.).

Peddigari, "Unified Cloud Migration Framework—using Factory based approach," 2011 Annual IEEE India Conference, (Dec. 16-18, 2011, pp. 1-5).

"Planning the Migration of Enterprise Applications to the Cloud," Cisco, (2010, 9 pgs.).

Rashmi et al., "A five-phased approach for the cloud migration," International Journal of Emerging Technology and Advanced Engineering, vol. 2, No. 4, (Apr. 2012, pp. 286-291).

Tran et al., "Size Estimation of Cloud Migration Projects with Cloud Migration Point (CMP)," 2011 International Symposium on Empirical Software Engineering and Measurement, (Sep. 22-23, 2011, pp. 265-274).

Varia, "Migrating your Existing Applications to the AWS Cloud," Amazon Web Services, (Oct. 2010, 23 pgs.).

* cited by examiner

```
ampthread c
    void *sleeping(void-???)
    int 2/
    pthread_t tid(???_THREADS);      /* array of three int
    main(int arge. cher .argv(1)
    (
        if (arge - )
            printer(
            printer(
            return ( );

switch (argv()) (
            case . ] .??? -
                for ( 1 - ; 1 < NUM THREADS: 1..)
                    pthread_create(???:), NULL.
                        (void .)SLEEP TIME);
                for ( 1 - ; 1 < NUM THREADS: 1..)
                    pthread_join(???[?], NULL) :
                break;

case : ???
                for ( 1 - ; 1 < NUM THREADS: 1..)
                    pthread_create(??? )
                while (pthread_join)
    O O
                break:
            ? ??? ???
            print(
            return (1)
            ???
        )
        void .
        sleeping (void .arg)
        ?
C source file                       length:1729 ???:53
```

```
ampthread c
    void *sleeping(void-???)
    int 2/
    pthread_t tid(???_THREADS);      /* array of three int
    main(int arge. cher .argv(1)
    (
        if (arge - )
            printer(
            printer(
            return ( );

switch (argv()) (
            case . ] .??? -
                for ( 1 - ; 1 < NUM THREADS: 1..)
                    pthread_create(???:), NULL.
                        (void .)SLEEP TIME):
                for ( 1 - ; 1 < NUM THREADS: 1..)
                    pthread_join(???[?], NULL) :
                break:

case : ???
                for ( 1 - ; 1 < NUM THREADS: 1..)
                    the_create (NULL. .sleeping.
                        (???[1]):
                    while (thr_join(. NULL. NULL) - )
    O O O
                break:
            ? ??? ???
            print(
            return (1)
            ???
        )
        void .
        sleeping (void .arg)
        ?
in:1 Col-2 Sel:0    DosWindows    ANSI    INS
```

SYSTEM AND METHOD FOR MODELING CLOUD RULES FOR MIGRATION TO THE CLOUD

RELATED APPLICATIONS

This application claims the benefit of U.S. Provisional Application Ser. No. 61/588,255 filed Jan. 19, 2012, for a "System and Method for Modeling Cloud Rules for Migration to the Cloud," which is hereby incorporated by reference in its entirety.

TECHNICAL FIELD

The invention relates generally to computerized systems and methods and, more particularly, to a method and tool for modeling cloud rules for migration to the cloud. In general, "cloud computing" refers to technologies that provide computation, software, data access, and/or storage services that do not require end-use-knowledge of the physical location and configuration of the system that delivers the services.

BACKGROUND AND SUMMARY

The re-architecture and migration of a business system typically begins with the definition of the goals and objectives of the business and the reference architecture defined for the target cloud platform. The entire process to analyze, estimate and migrate the business system to the target cloud platform is presently a manual and time consuming process. There are a few tools available in the market which are specific to a cloud platform and can do the analysis. However, these tools are very target platform specific and do not lend themselves to extension and, thus, are not really fully usable.

In one aspect, the system and method described herein is an attempt to define a reusable and extensible model for definition of cloud rules based on the enterprise architecture blueprint of an enterprise and a run-able framework to execute the rules and also automatically give an estimate of the changes, as well as rectify the code wherever possible.

The following definitions may be helpful in understanding the system:

Application—The application that needs to be migrated to any target platform;

Source Platform—The platform (hardware and software stack) on which the application currently runs;

Target Platform—The cloud platform whether private, public or hybrid to which the application needs to be migrated;

Cloud Commandments—Tenets which the application must obey for residing on the Target Platform;

Rules—Software programs written to represent the target architecture; and

Profiles—Profile is a collection of rules. It is used here to represent architecture blueprint of an organization.

Additional features and advantages of the invention will become apparent to those skilled in the art upon consideration of the following detailed description of the illustrated embodiment exemplifying the best mode of carrying out the invention as presently perceived. It is intended that all such additional features and advantages be included within this description and be within the scope of the invention.

BRIEF DESCRIPTION OF THE DRAWINGS

The present disclosure will be described hereafter with reference to the attached drawings which are given as non-limiting examples only, in which.

Corresponding reference characters indicate corresponding parts throughout the several views. The components in the figures are not necessarily to scale, emphasis instead being placed upon illustrating the principals of the invention. The exemplification set out herein illustrates embodiments of the invention, and such exemplification is not to be construed as limiting the scope of the invention in any manner.

DETAILED DESCRIPTION OF THE DRAWINGS

Figure 1:
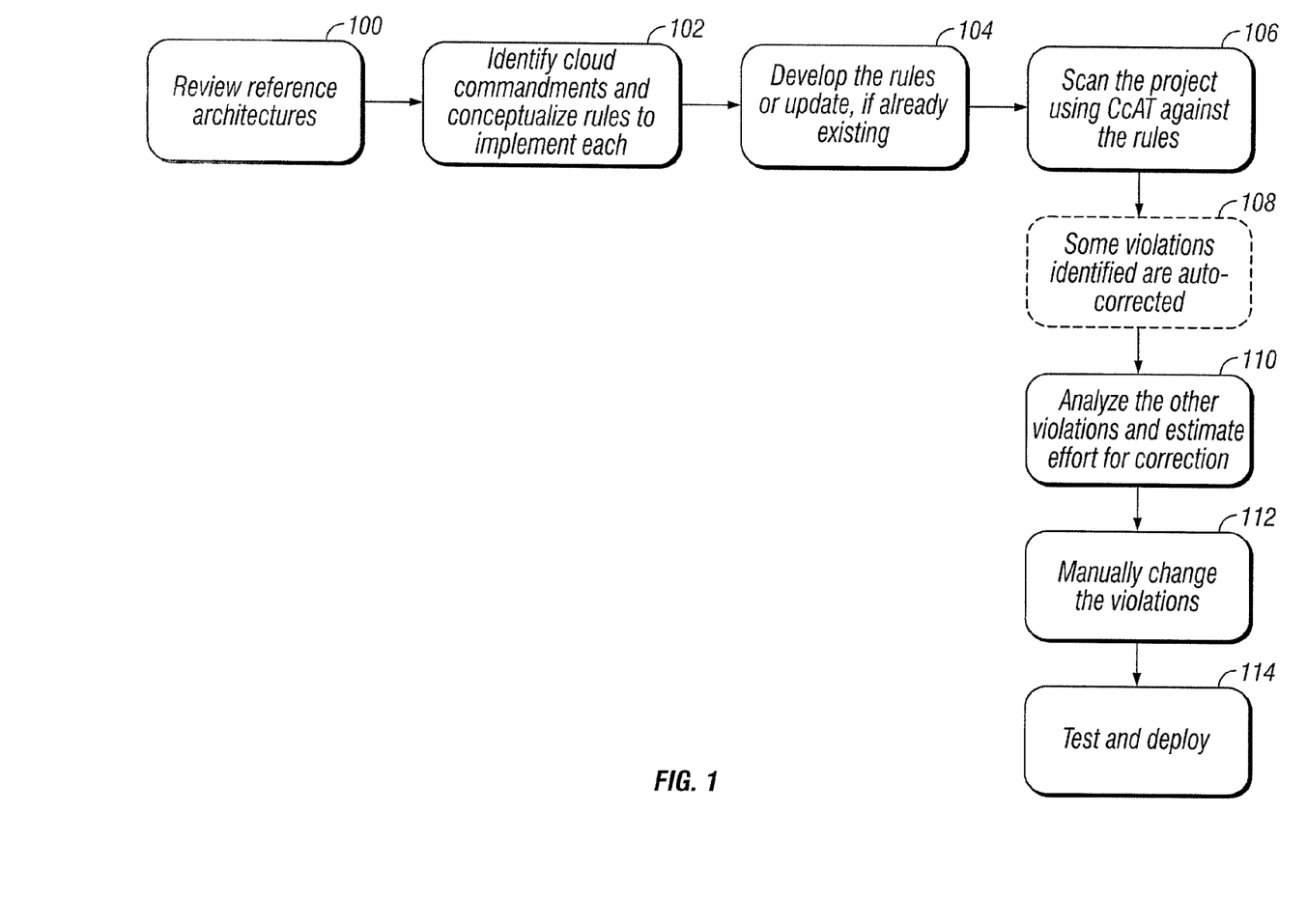
FIG. 1 illustrates an overall process flow for migrating a business system from current environment to the target cloud environment utilizing the Cloud Code Automation Tool ("CcAT") framework according to one embodiment.

FIG. 1 shows an example process flow for developing code for execution on a computer in a cloud environment, according to one embodiment. The process includes a review of the high-level and low-level architectures of the source platform and the target platform (Block 100). Other collaterals such as the component, collaboration and deployment diagrams are studied. The interactions between the different systems are identified. Based on the previous stage, constraints for any application for residing on the target platform are identified. These become the cloud commandments that any application on the target platform must adhere to. Examples of these cloud commandments could be for purposes of example that the application should not make any local file system access, the application should not use any concurrency locks, the application should not use Enterprise Java Beans ("EJBs"), etc.

Based on these cloud commandments, rules are conceptualized that will implement the commandments (Block 102). For example, for the no local file system access, the rules could be by way of example that the application should not have any file I/O statements, the application should not use any native APIs, etc. After conceptualizing the rules, they are developed in a programming language, such as Java or C++. In the event that similar pre-developed rules are available, they are updated for the new scenario. The rules are tested (Block 104).

In the next step, the application is scanned using the cloud code automation tool ("CcAT tool") against all the rules developed for all the cloud commandments in the previous step (Block 106). The CcAT tool creates a detailed report of all the violations of the cloud commandments in the application. For some types of applications and for certain violations, the CcAT tool could be intelligent enough to automatically correct the violation (Block 108). The tool reports the correction made at the end.

The violation report generated by the CcAT tool is analyzed (Block 110). Detailed and graphical reports are available about violations at the rule level (i.e., how many files violate that particular rule), as well as at file-level (i.e., how many violations occur in that particular file.) Based on these reports, the effort required for manually correcting the violations is estimated. The violations are manually corrected in each of the files (Block 112). The modified application is compiled, tested and finally deployed on the target platform (Block 114).

CcAT Engine Architecture

In one embodiment, the analysis framework is built on top of the SONAR™ quality analysis tool made available on sonarsource.org, with source code available at www.codehaus.com. The CcAT tool has separate frameworks for Java code analysis and C code analysis in the embodiments which are described below with reference to FIGS. 2 and 3. Enterprise applications built using Java technology extensively use properties files to store dynamic configuration variables. These files need to be scanned to do a complete analysis of a Java application for movement to cloud. The CcAT Jproperties Plugin 200 is a framework which achieves the same.

Figure 2:
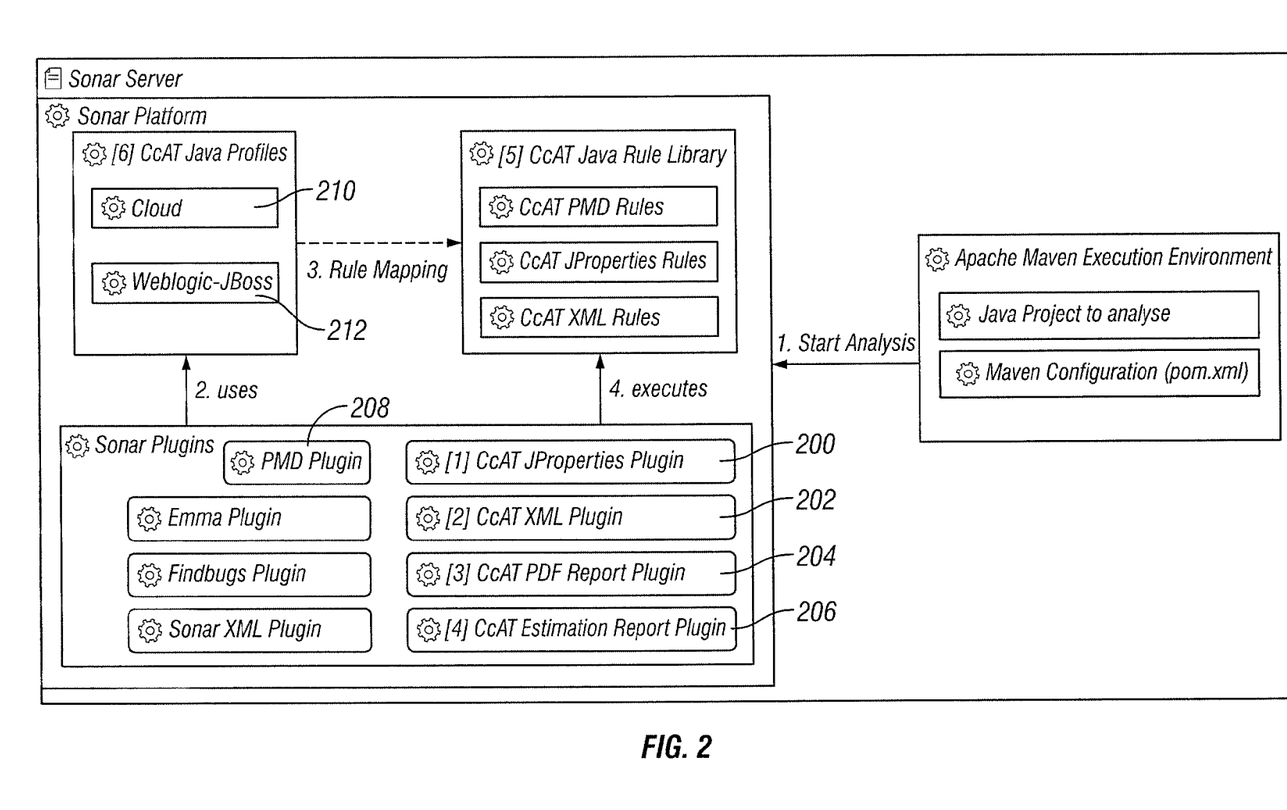
FIG. 2 depicts the Java Code Analysis Framework according to one embodiment.

Distributed Java applications require an application server to execute. These servers keep their configuration in XML files. Analysis of XML files is required for movement from one application server environment to another as this typically happens when the application moves to the cloud environment. The CcAT XML plugin 202 is the framework which achieves the same.

In some embodiments, database scripts could be scanned to review migration potential. For example, a static analysis of database scripts and stored procedures could be performed for migration from the source platform to target platform. For example, the following analysis could be provided: a) Scan of table structure for compatibility with the target platform and b) Scan of stored procedures for compatibility with the target platform. In some cases, the functionality checks on table keys using Regular Expressions. The purpose of the check is to look for keys that are not allowed. The functionality validates if the table data structure is allowed in target platform or not.

In some embodiments, a server environment could be scanned to review for migration dependencies. For example, this could be implemented in scripts that provide one or more of the following functionalities: a) checking of processes that are invoked on a server for a specified period of time, which gives an inventory of applications running on the server to be migrated; b) checking of tcp traffic moving from a server to other ip addresses over a specific period of time, which gives the dependency map of the server with other servers it is communicating, and c) checking of versions of the environment, which includes environments from OS, middleware products and COTs products.

The analysis output achieved by scanning the source code needs to be documented and delivered to the application owner. Typically this has been created manually which is a time consuming process and delays the communication of analysis output to the owner. The CcAT PDF report plugin 204 is a framework created to remove this manual intervention and automatically to create a final analysis and recommendation report as soon as the analysis is complete. Any technical analysis does not provide a meaningful output for senior management unless it can be converted into a dollar figure which can be used for budgeting. This is achieved using the CcAT estimation plugin 206. To scan any application for violations rules are defined. The Java code specific rules are defined using the PMD plugin 208 available at pmd.sourceforge.net, and the others are developed using the XML and Jproperties plugin.

To fully scan an application a profile is created. These profiles are a collection of rules, estimation model, output report template, and is targeted to an environment. CcAT contains two predefined profiles aimed at Java (i.e., cloud 210) for analysis of Java application for migration to cloud and Weblogic-JBoss 212 for a cloud platform which is built using Jboss 212 and the existing client environment uses Weblogic as an application server in the embodiment shown.

Figure 3:
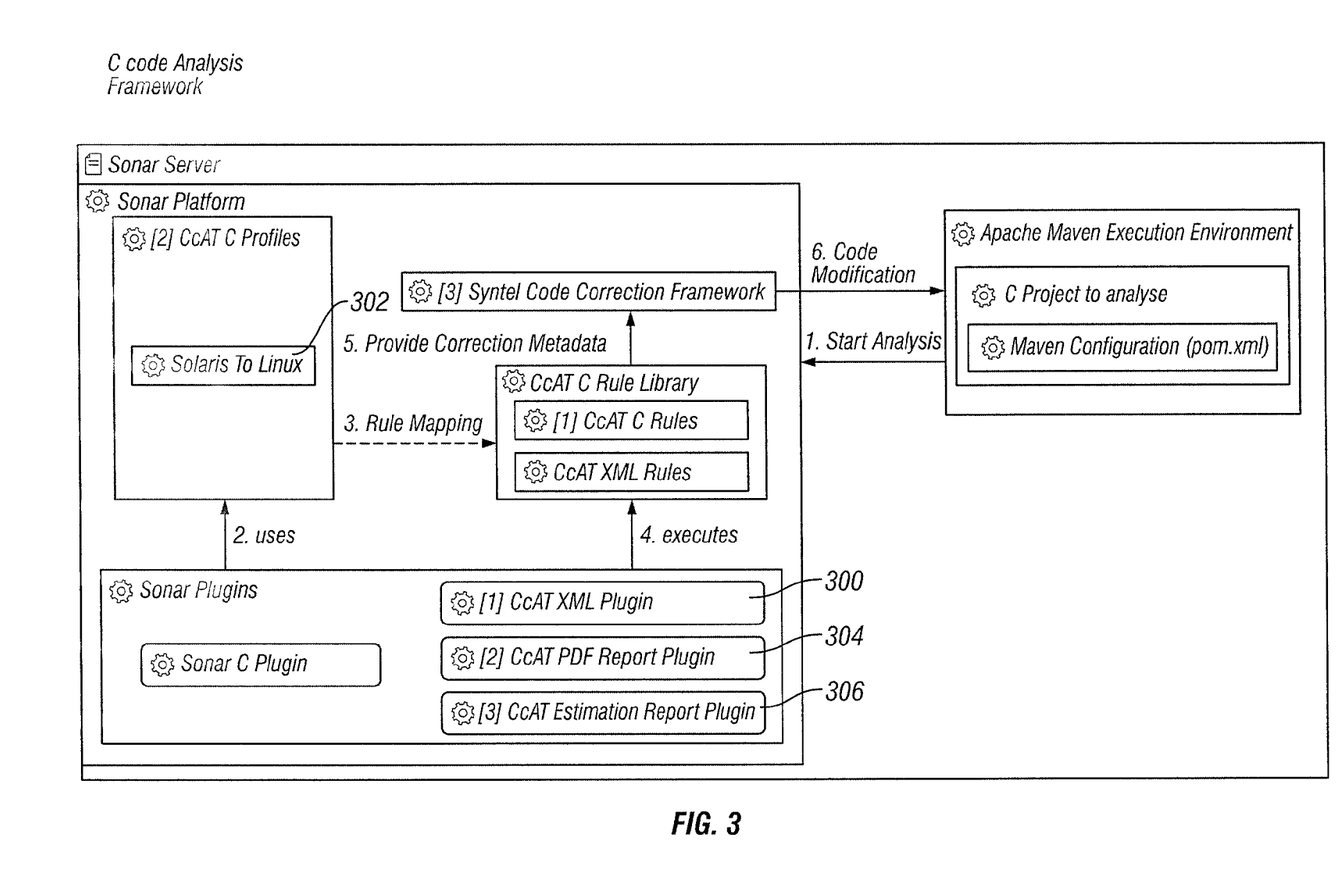
FIG. 3 depicts the C Code Analysis Framework according to one embodiment.

Referring to FIG. 3, for Enterprise applications built using C technology, the C code specific rules are defined using Xpath queries and rules targeted to process the make file and header files are defined using the XML plugin 300.

In the embodiment shown, the CcAT tool contains one predefined profile for C code analysis 302, which is the Solaris to Linux Profile in this example that has rules to analyze the c code written for the Solaris platform and the target cloud platform is a x86 based Linux platform.

The next step after code analysis is the correction of the code to run on the target platform. To improve the efficiency of this manual change process, a code correction framework is built. This takes in the analysis output and wherever possible retrofits the code using the CcAT PDF Request Plugin 304. As discussed above with respect to the Java analysis, the CcAT estimation plugin 306 provides budgeting estimates.

Dynamic Rules Execution Engine

Figure 4:
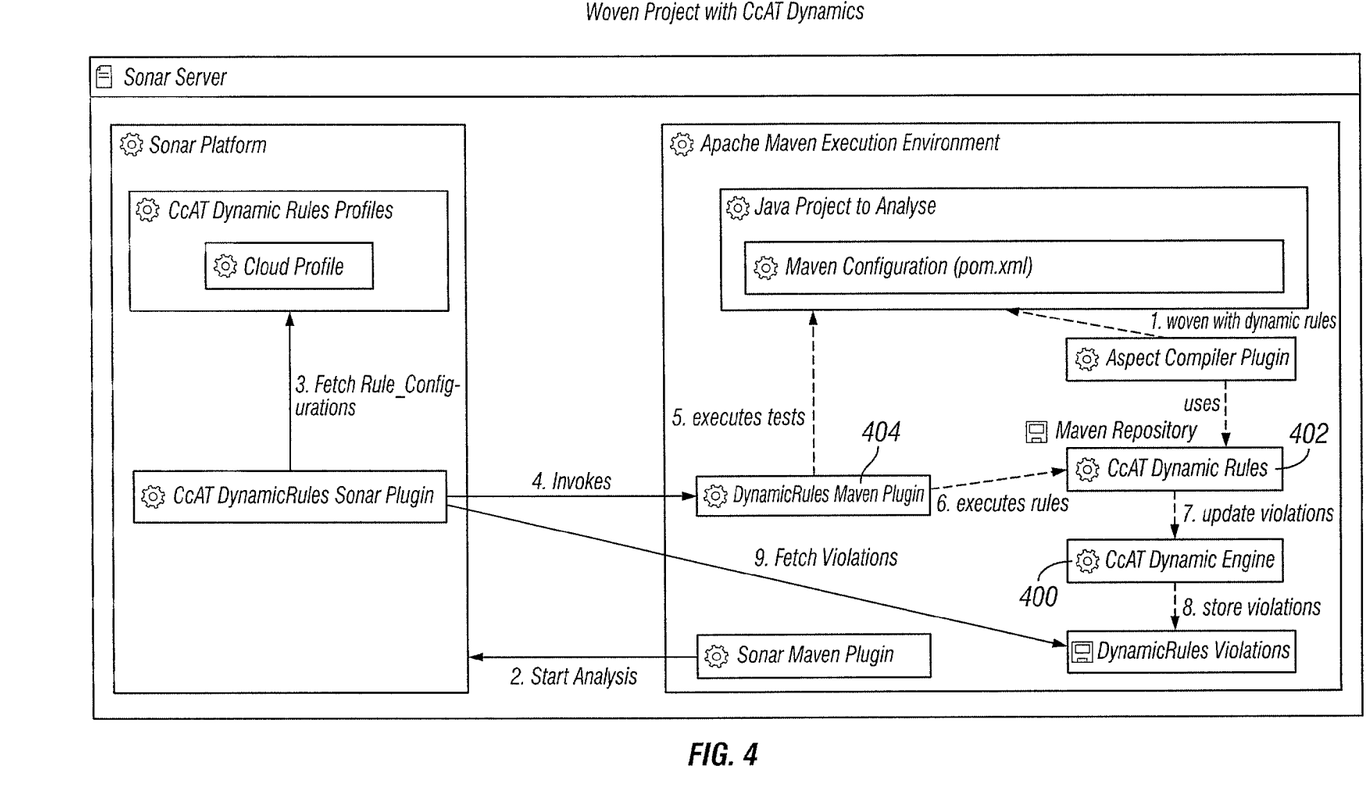
FIG. 4 depicts the architecture of the Dynamic Execution Engine according to one embodiment.

The dynamic rules execution engine is used to find violations that cannot be captured using static analysis, as shown in FIG. 4. This engine analyzes the application at run-time to check if there are any violations to the rules for the target platform. It is also useful to capture any violations to the rules made by third-party libraries. Since the analysis happens at run-time, the engine can record the stack trace to capture the complete flow until the problem arises.

Writing custom checks or rules are contemplated. For example, the following code shows a custom rule to prevent usage of the "java.util.concurrent" package.

```
import cloud.dynamic.rules.AbstractAspectRule;
import cloud.dynamic.rules.ViolationLevel;
public aspect AvoidConcurrentPackage extends
    AbstractAspectRule {
public static final String RULE_NAME =
    "SYN_DYN_AvoidConcurrentPackage";
public static final String RULE_CATEGORY = "concurrency";
public static final int DEFAULT_WEIGHTAGE = 3;
public AvoidConcurrentPackage( ) {
    super(RULE_NAME, RULE_CATEGORY,
    ViolationLevel.WARNING,
    DEFAULT_WEIGHTAGE);
}
protected pointcut rule ( ): call (* java.util.concurrent..*+.*(..));
}
```

The CcAT dynamic engine 400 records all the violations captured by the dynamic rules in the repository. It also generates the violation report in HTML format at the end of execution. The CcAT dynamic rules 402 are the rules to perform the dynamic analysis. These rules capture the complete stack trace until the location of the violation. The dynamic rules maven plug-in 404 helps in integration of the CcAT dynamic engine and CcAT dynamic rules components with maven in this example. The CcAT dynamic rules plug-in integrates the dynamic rules execution engine with the CcAT tool. It invokes the dynamic rules maven plug-in to analyze the project. After completion of the analysis, it conveys the violations found to the CcAT tool.

XML Processing Engine

The XML processing engine performs static analysis of XML files for migrating them from the source platform to the target platform, as discussed below with reference to FIG. 5. It is designed as a plug-in to the CcAT tool. The plug-in imports the XML files into CcAT and performs the validations. In the embodiment shown, the engine provides the following functionalities—
  a) XML validation
  b) XML schema validation
  c) Configurable RULES for XML validation
  d) Sizing (number of XML files, lines of code analyzed)

In this embodiment, the XML validation is an out of the box feature. The configurable rules for XML validation are implemented using the "XPATH Check" functionality that is built into the plug-in. The following steps are involved in the static analysis of the XML files—
  a) Parsing the XML files using either SAX or DOM parser
  b) Creation of custom Rules for performing the migration
  c) If the "XPATH Check" functionality is being used, then passing the necessary parameters to the functionality to generate the custom Rules
  d) Validating the XML files based on the custom Rules The "XPATH Check" functionality allows the specification of validations on the XML files using XPATH expressions. The purpose of the validations is to look for nodes and attributes that are not allowed. The functionality validates the XML document using user configured XPATH expressions and also allows the configuration of messages to be displayed for violations. For configuring the "XPATH Check" functionality, the user has to go to the configuration pages where one can edit the quality profiles. The rules can be edited in one's own profile. The user selects the XPATH rule. In this embodiment, the rule has two properties—a) the XPATH expression, and b) the message to display on violation. The XPATH expression looks for nodes or attributes that are not allowed. In the quality profile, one can make multiple XPATH rules in the same way as it is done for PMD. The following is a non-exhaustive list of example expressions—

---

//b (finds all occurrences of <b>
//td[@nowrap] (finds all occurrences of td with the deprecated attribute "nowrap")

---

A rich library of checks can be created using the powerful XPATH expression language. "XPATH Check" can be instantiated multiple times in a rules profile.

Figure 5:
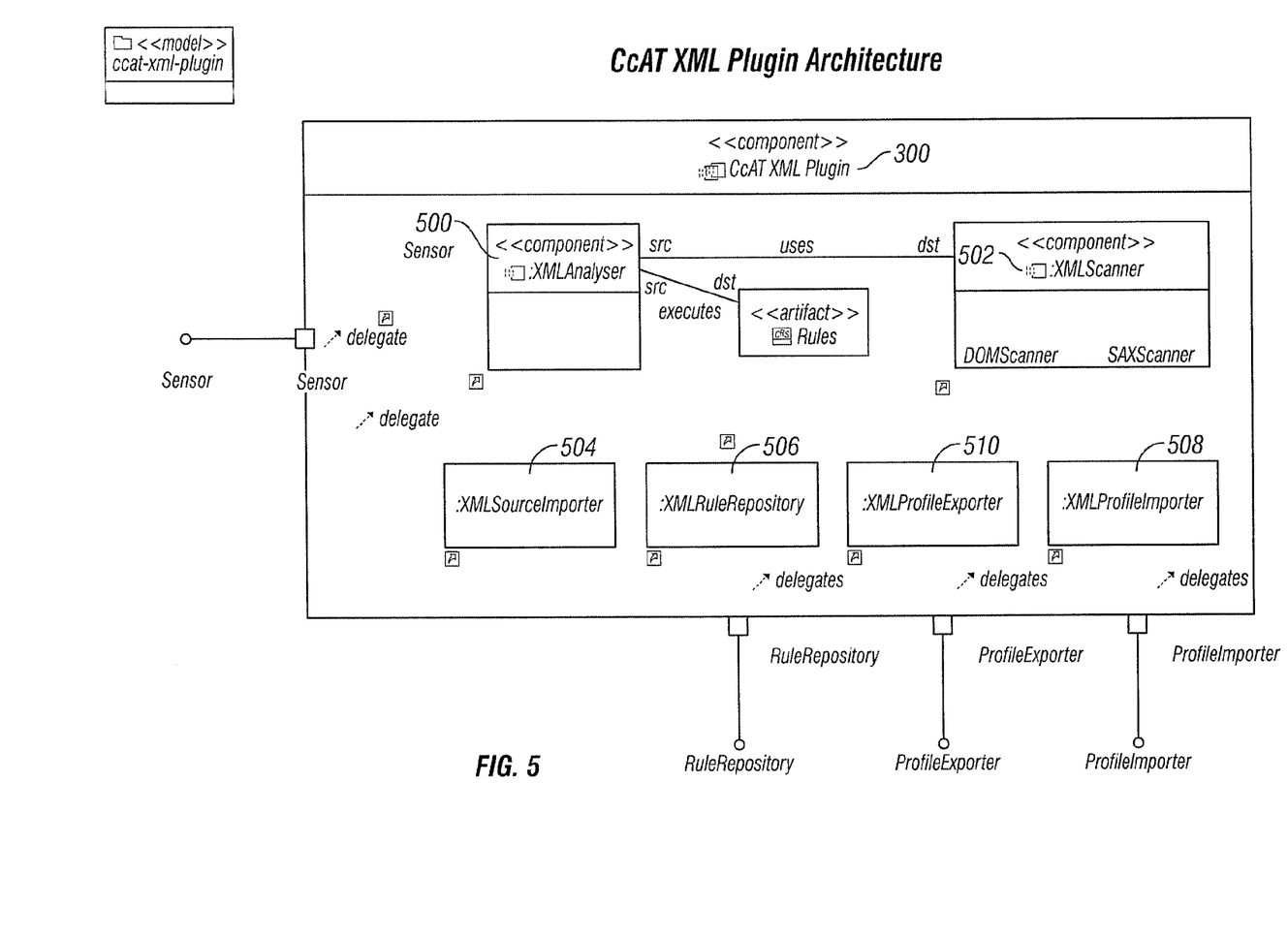
FIG. 5 depicts the XML Plugin Architecture according to one embodiment.

Referring to FIG. 5, the following are example modules that could be provided:
  XML Analyzer 500: This component starts the XML analysis on each XML file of the project by applying XML RULES against the XML files. It uses the "XML Scanner" component to parse the XML files.
  XML Scanner 502: This component parses the XML files by using either DOM or SAX parser depending on the RULES configured in the profile.
  XML SourceImporter 504: This component imports XML source files into the CcAT tool.
  XML RuleRepository 506: This component implements the plug-in Rule Repository for the CcAT tool. This plays a major role in importing the custom RULES into the CcAT tool.
  XML ProfileImporter 508: This component imports the XML profiles into the CcAT tool.
  XML ProfileExporter 510: This component exports the XML profiles from the CcAT tool.

Java Properties File Processing Engine

The Java properties file processing engine performs static analysis of Java properties files for migration from the source platform to the target platform. It is implemented as a plug-in to the CcAT tool. The plug-in imports the properties files into CcAT and performs the validations. The engine provides the following example functionalities—
  a) Java properties file validation
  b) Configurable rules for properties file validation In this embodiment, the Java properties file validation is available as an out of the box feature. The configurable rules for properties file validation are implemented using the "KeyMatchCheck" and "ValueMatchCheck" functionalities that are built into the plug-in. "KeyMatchCheck" functionality allows the specification of checks on Java property keys using regular expressions. The purpose of the check is to look for property keys that are not allowed. The functionality validates the Java properties files using user configured regular expressions and also allows the configuration of messages to be displayed for violations. For configuring the "KeyMatchCheck" functionality, the user can edit the quality profiles by going to the configuration pages. One can edit the rules in one's own profile. The user selects the KeyMatchCheck rule. The rule has two properties in this embodiment—a) a Regular Expression, and b) the message to be displayed on violation. The regular expression looks for keys that are not allowed. In the quality profile, one can make multiple "KeyMatchCheck" rules in the same way as it is done for PMD. "ValueMatchCheck" functionality is similar to "KeyMatchCheck," except that it specifies checks on Java property values using regular expressions. The purpose of the check is to look for property values that are not allowed. In CcAT, one can create the "ValueMatchCheck" rules while editing the rules profile in the same way as "KeyMatchCheck."

Figure 6:
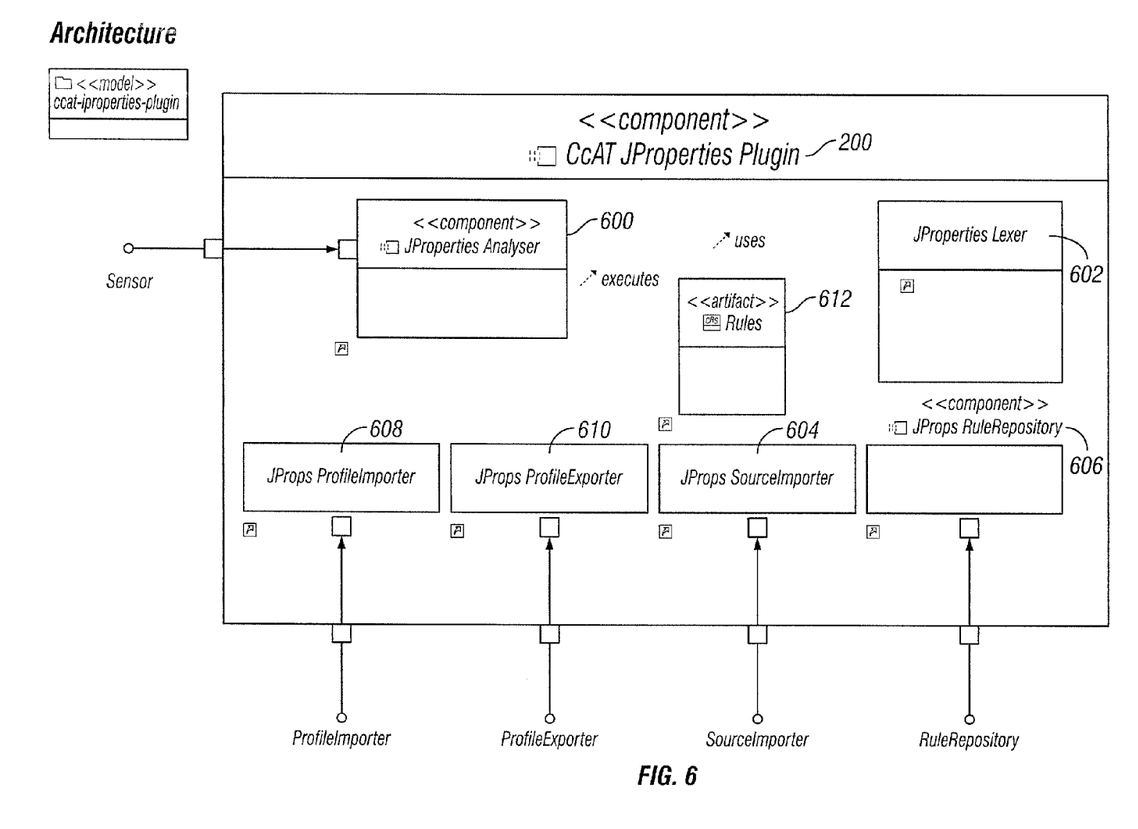
FIG. 6 depicts the JProperties Plugin Architecture according to one embodiment.

FIG. 6 shows an example architecture for the Jproperties plugin, which may include the following modules:
  JProperties Analyzer 600: This component starts the analysis on each property file of the Java project by applying Java Property rules. This uses JProperties Lexer to parse the property files.
  JProperties Lexer 602: This component parses the property files and creates a tree structure from the Key-Value pairs.
  JProperties SourceImporter 604: This component imports the Java properties files into the CcAT tool.
  JProperties RuleRepository 606: This component implements the plug-in Rule Repository for the CcAT tool. This plays major role in importing the custom rules into CcAT Tool.
  JProperties ProfileImporter 608: This component helps to import active custom Rules into CcAT profile.
  JProperties ProfileExporter 610: This component helps to export the active custom Rules from CcAT tool.
  Rules 612: Custom Rules to execute against Java properties files. The checks "KeyMatchCheck" and "ValueMatchCheck" are example of custom Rules.

Report Generation Framework

Figure 7:
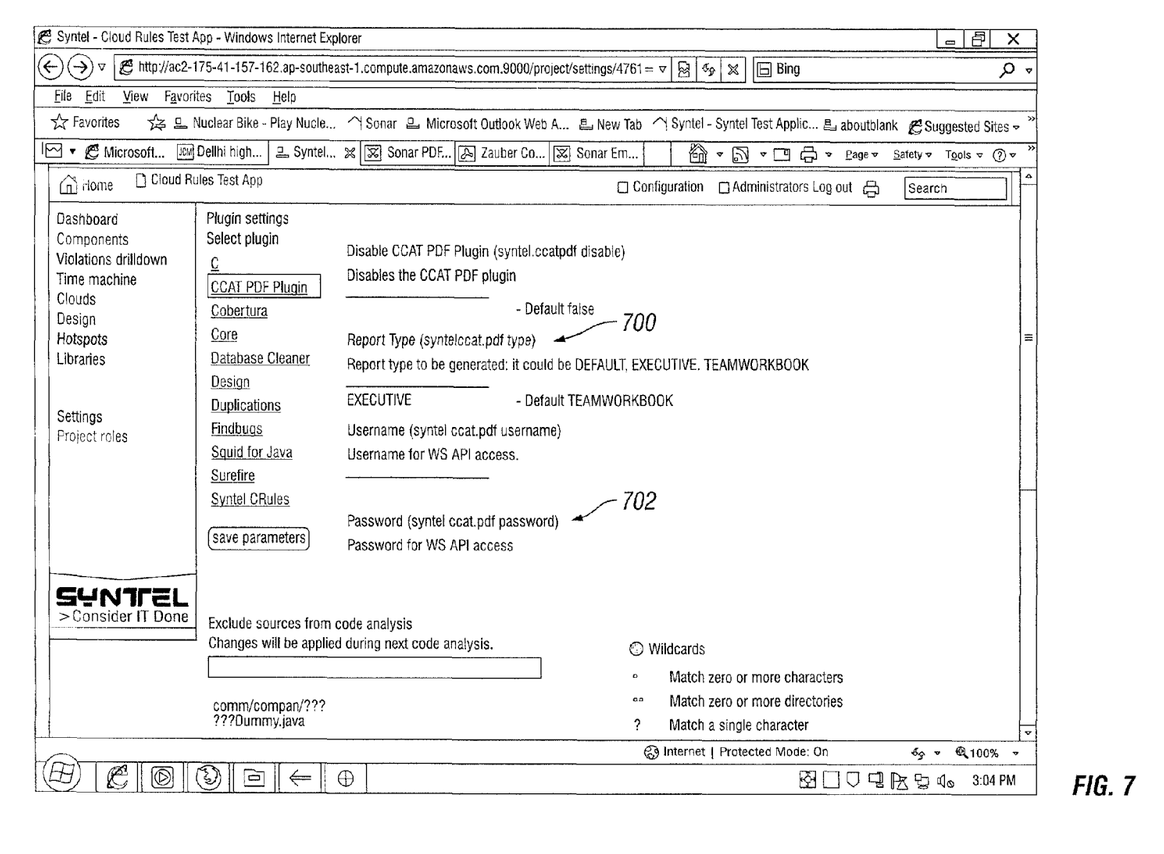
FIG. 7 is a screenshot showing an example reporting interface that could be used according to one embodiment.

In this embodiment, the report generation framework generates a PDF report representing the most relevant information about the analysis done by the CcAT tool on the application, or the XML files, or the Java properties files, etc., that need to be migrated from the source platform to the target platform, as described with reference to FIG. 7. This report aims to be a deliverable as part of the project documentation. The report generation framework is implemented as a plug-in to the CcAT tool.

In one embodiment, the report contains the following information—

- Global dashboard (similar to the SONAR web interface dashboard)
- Most violated rules
- Most violated files
- Most complex classes
- Most duplicated files
- RULE wise violations
- Dashboard, violations and hotspots for all child modules (if they exist)

The PDF report is generated after each analysis in CcAT (e.g., "mvn sonar:sonar" includes the generation of the report).

The report generation plug-in allows the user to skip the report generation at top-level or project-level. The plug-in also allows the user to specify the report type 700, such as executive or workbook. The user can also specify a username/password 702 if the project is secured by CcAT user management.

Figure 8:
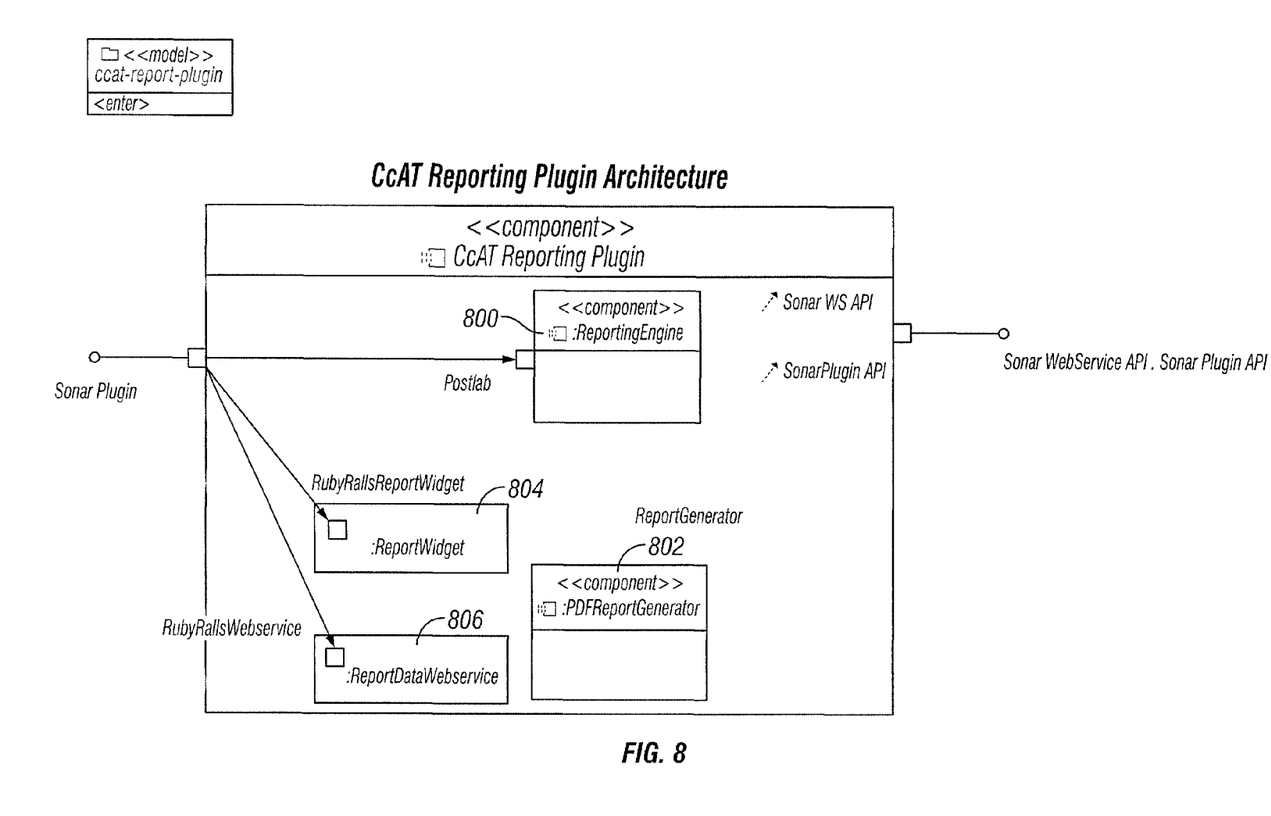
FIG. 8 depicts the Reporting Plugin architecture according to one embodiment.

FIG. 8 shows an example architecture for the CcAT Reporting Plugin, which includes the following example modules:

- Reporting Engine 800: This is the main component in the CcAT Report generation plug-in. The Reporting Engine runs after the completion of every project analysis. This collects the information about different measures and violation information of the project being analyzed by using the CcAT Webservice API. It uses the PDFReportGenerator component to generate the PDF document.
- PDFReportGenerator 802: This is the helper component of Reporting Engine to generate the report in PDF format. This component uses iText Java library to generate the PDF report.
- ReportWidget 804: This component displays the CcAT PDF Report plug-in widget in CcAT project dashboard to facilitate the report download functionality.
- ReportDataWebService 806: This is the WebService to push the PDF report data to the browser. It is invoked whenever the user requests for the PDF report by clicking the link displayed on the project dashboard.
- CcAT C Rules Engine The CcAT C rules engine analyzes a C application for migration from the source platform to target platform. In this embodiment, the plug-in embeds its own source code analyzers to detect duplicate code, comments, etc., and to compute metrics like statements, functions, complexity and lines of code. It also provides an empty rules engine which can be extended with custom C rules.

The CcAT C rules engine also has an automated code-correction feature. The engine in one embodiment provides the following features—

- Check for portable operating system interface ("POSIX") compliance of the code
- Automatic replacement of simple and moderately complex APIs and System calls
- Exact location (file name, path, line number) of the violating APIs, Solaris specific system calls
- Customized message for each violation indicating possible remediation for that violation
- Statistics for estimation of effort required for migration One can incorporate automatic code-correction functionality in one's custom rules too. In this embodiment, "SyntelCCheck" is the base class to support code-correction functionality for C rules. So, to incorporate code-correction functionality in one's custom C rule, one has to extend "SyntelCCheck" class. This class has the method "addCorrection" to add the correct code. The following example shows the custom C Rule with automatic code-correction functionality for the simple tokens in C.

```
import org.sonar.check.Cardinality;
import org.sonar.check.Priority;
import org.sonar.check.Rule;
import org.sonar.check.RuleProperty;
import com.sonar.sslr.api.AstAndToken Visitor;
import com.sonar.sslr.api.Token;
import com.syntelinc.sonar.plugins.crules.correction.TokenCorrection;
/**
 * @author cnarvan
 *
 */
@Rule(
key = TokenCheck.KEY,
name = TokenCheck.NAME,
description = TokenCheck.DESCRIPTION,
priority=Priority.MAJOR,
cardinality=Cardinality.MULTIPLE
)
public class TokenCheck extends SyntelCCheck implements
AstAndToken Visitor {
    ...
    public void visitToken(Token token) {
        if(this.token!=null && this.token.equals(tokenToReplace)) {
            log(message, token, token.getValue( ));
        if(replacementToken!=null &&
        replacementToken.trim( ).length( )>0) {
        addCorrection(new TokenCorrection(token, replacementToken));
            }
        }
    }
    ...
}
```

Figure 9:
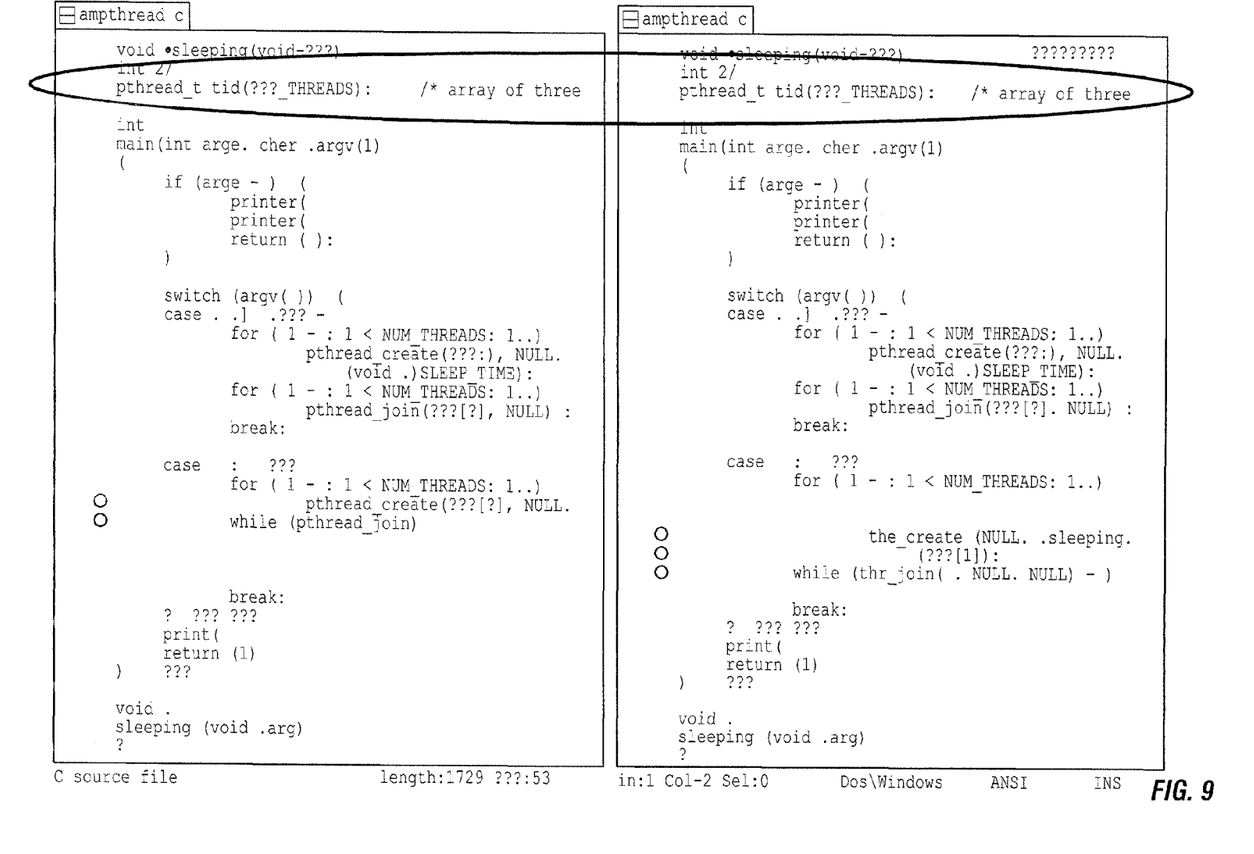
FIG. 9 depicts the C code change review according to one embodiment.

In the example code above, tokenToReplace and replacementToken variables describe the original token and alternate token to replace the original token, respectively. The diagram in FIG. 9 shows the sample output of the code correction functionality of one custom "pthread" rule.

Figure 10:
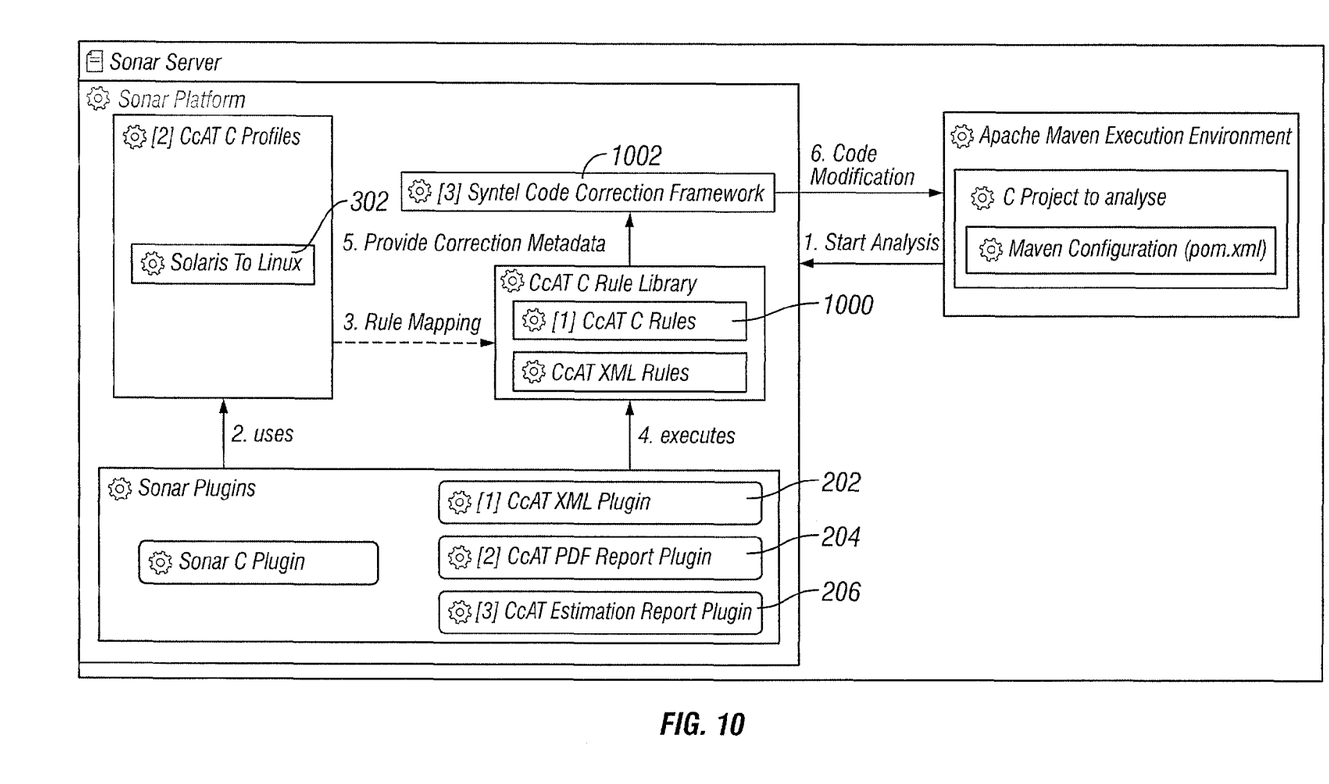
FIG. 10 depicts the C-Plugin Architecture according to one embodiment.

FIG. 10 shows an example architecture for the C Plugin that includes the following functionality:

- CcAT C Rules 1000: This represents the custom C Rules for the CcAT C rules engine. These rules use "Syntel Code Correction Framework" to implement auto code-correction functionality.
- Syntel Code Correction Framework 1002: This component implements the functionality of code correction using the input parameters token, location of the token, the alternate token that should replace the original token and the file. It creates a copy of the original file with modifications.

Although the present disclosure has been described with reference to particular means, materials, and embodiments, from the foregoing description, one skilled in the art can easily ascertain the essential characteristics of the invention and various changes and modifications may be made to adapt the various uses and characteristics without departing from the spirit and scope of the invention.

What is claimed is:

1. A computerized method for modeling rules for migration to the cloud, the method comprising the steps of:

providing a computer including a processor and executable instructions stored on a memory coupled to the processor;

reviewing, using executed instructions on the computer, without further intervention of a user, architectures of a source platform and a target platform, wherein the architectures are the organizational structures of the source platform and the target platform, and the reviewing includes identifying the interaction between the architectures to determine constraints for migration of the source platform to the target platform;

defining, using executed instructions on the computer, without intervention of a user, a plurality of rules, wherein the plurality of rules implement the constraints of the target platform and the defining includes developing the plurality of rules in at least one programming language of the source platform and the target platform;

scanning, using executed instructions on the computer, without further intervention of a user, source code of an application intended to be migrated to the target platform to determine whether the application violates any of the plurality of rules;

correcting, using executed instructions on the computer, without further intervention of the user, via a code correction framework for at least one type of source code, one or more violations of the plurality of rules of the source code according to an original token, a location of the original token, and an alternate token for replacing the original token wherein the tokens are elements of the source code; and generating, using executed instructions on the computer, without further intervention of a user, a report including any violations of the plurality of rules that have been corrected and any violations of the plurality of rules not corrected, the latter left for manual correction by the user;

wherein the correcting step includes automatically modifying, via a PDF report plugin, the source code of the application to correct the one or more violations of the plurality of rules.

2. The method of claim 1, wherein the method is compatible with a SONAR™ quality analysis tool.

3. The method of claim 2, further comprising the step of deploying the application to the target platform.

4. The method of claim 3, wherein the target platform is a cloud platform.

5. The method of claim 1, further comprising the step of estimating, using an estimation plugin on a computer, a monetary cost for modifying the source code of the application to correct one or more violations of the cloud commandments based a number of violations in the report.

6. The method of claim 1, wherein the scanning step analyzes the application for any violations of the plurality of rules at run-time.

7. The method of claim 6, wherein the scanning step records program flow of the application at run-time to capture flow until a violation occurs.

8. The method of claim 1, wherein the scanning step analyzes source code of the application to detect duplicate code.

9. The method of claim 1, wherein the scanning step analyzes source code of the application to calculate one or more of a number of statements in the source code, a number of functions in the source code, and a number of lines of code in the source code.

10. The method of claim 1, wherein the scanning step analyzes source code of the application to determine at least the following characteristics for any violations of the plurality of rules: (1) file name, (2) path, and (3) line number.

11. The method of claim 1, further comprising the step of scanning database scripts to determine migration potential.

12. The method of claim 11, wherein migration potential is determined by scanning of a table structure of a database for compatibility with the target platform.

13. The method of claim 11, wherein migration potential is determined by scanning of stored procedures for compatibility with the target platform.

14. The method of claim 11, wherein migration potential is determined by an analysis of keys.

15. The method of claim 1, further comprising the step of scanning a server environment to determine migration dependencies.

16. A computerized method for modeling rules for migration to the cloud, the method comprising the steps of:

providing a computer including a processor and executable instructions stored on a memory coupled to the processor;

reviewing, using executed instructions on the computer, without further intervention of a user, architectures of a source platform and a target platform, wherein the architectures are the organizational structures of the source platform and the target platform, and the reviewing includes identifying the interaction between the architectures to determine constraints for migration of the source platform to the target platform;

defining, using executed instructions on the computer, without intervention of a user, a plurality of rules, wherein the plurality of rules implement the constraints of the target platform and the defining includes developing the plurality of rules in at least one programming language of the source platform and the target platform;

scanning, using executed instructions on the computer, without further intervention of a user, source code of an application intended to be migrated to the target platform to determine whether the application violates any of the plurality of rules;

analyzing, using executed instructions on the computer, without further intervention of a user, (a) one or more XML files including a configuration of the source code for violations of the plurality of rules, (b) one or more Java properties files associated with the source code for violations of the plurality of rules, or both (a) and (b);

correcting, using executed instructions on the computer, without further intervention of a user, via a code correction framework for at least one type of source code, the violations according to an original token, a location of the original token, and an alternate token for replacing the original token; and generating, using executed instructions on the computer, without further intervention of a user, a report including any violations of the plurality of rules that have been corrected and any violations of the plurality of rules not corrected, the latter left for manual correction by the user;

wherein the correcting step includes automatically modifying, via a PDF report plugin, the source code of the application to correct the one or more violations of the plurality of rules.

17. The method of claim 16, wherein the analyzing step comprises analyzing (a) one or more XML files including a configuration of the source code for violations of the plurality of rules.

18. The method of claim 17, wherein the analyzing step comprises a static analysis of the one or more XML files.

19. The method of claim 16, wherein the analyzing step comprises analyzing (b) one or more Java properties files associated with the source code for violations of the plurality of rules.

20. The method of claim 19, wherein analyzing one or more Java properties files includes validating Java property keys according to user specifications; and, wherein the report includes user-defined messages for property key violations.

\* \* \* \* \*